3,295,806
TWO PART CLIP FOR ATTACHING A CYLINDRICAL MEMBER TO A SUPPORT
Robert Modémé, 25 Rue Hermel, Paris, France
Filed Sept. 9, 1965, Ser. No. 486,104
Claims priority, application France, Oct. 3, 1964, 990,271; Dec. 22, 1964, Ser. No. 999,591
4 Claims. (Cl. 248—74)

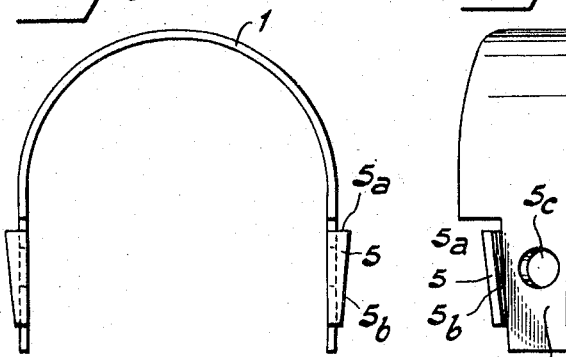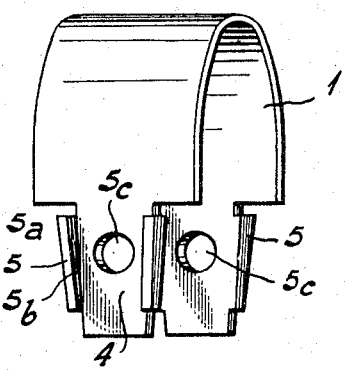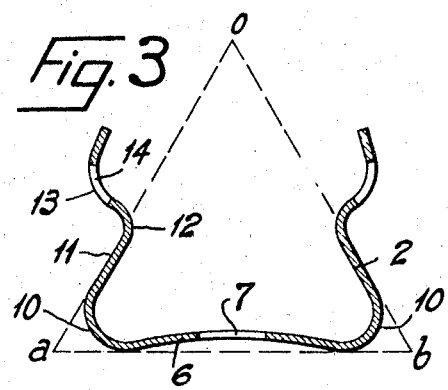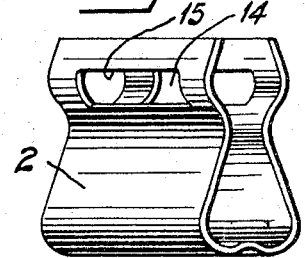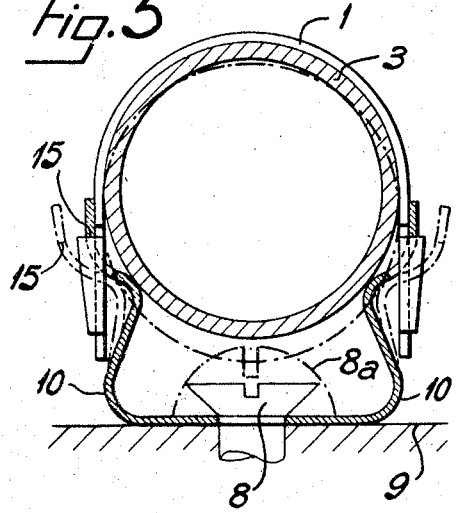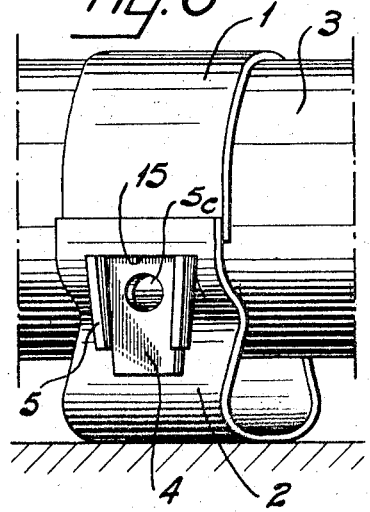
Inventor
Robert Modémé
By Stevens, Davis, Miller & Mosher
Attorneys

# United States Patent Office 3,295,806
Patented Jan. 3, 1967

The present invention relates to a two part clip for attaching a cylindrical member, such as a tube, cable or bar to a fixed support or work structure such as a wall.

It is an object of the present invention to provide a clip of this type which has a pleasing appearance, is simple to manufacture, takes up little space and is practical and reliable in operation.

In order to achieve the above-mentioned objects and in accordance with the invention there is provided a two part clip for attaching a cylindrical member, such as a tube, to a fixed support, the clip comprising a base portion for supporting the cylindrical member and an attaching portion engageable on the base portion, the base portion having a web provided with means for attaching the base portion to the fixed support and a pair of spaced upstanding arms which are bowed outwardly intermediate their length to form a pair of spaced upwardly facing shoulders adapted to support the cylindrical member and which have free ends projecting beyond the shoulders and the attaching portion being U-shaped and having two substantially parallel arms adapted to embrace the cylindrical member when it is supported on the said shoulders of the base portion and releasably engage the free ends of the arms of the base portion to resiliently clamp the cylindrical member thereto.

Preferably, the free ends of the arms of the base portion are slotted and the limbs of the attaching portion are formed with outwardly directed abutments engageable through the said slots in the arms of the base portion to lock the attaching portion thereto and releasable by outward movement of the slotted arms of the base portion.

Preferably also the arms of the base portion are inclined inwardly towards one another from the web and outwardly away from one another to form the said shoulders, whereby downward pressure on the cylindrical member supported on the said shoulders will move the said free ends of the arms apart to release the abutments from engagement therewith.

A preferred form of the invention is described below with reference to the accompanying drawings, which are given by way of example only, and in which, FIGURE 1 is an end view of the attaching part of a clip in accordance with the invention, FIGURE 2 is a perspective view of the attaching part of FIGURE 1, FIGURE 3 is a section taken through a median plane of the base portion of a clip according to the invention, FIGURE 4 is a perspective view of the base portion of FIGURE 3, FIGURE 5 illustrates, in section, a tube mounted in a clip according to the invention, and FIGURE 6 is a perspective view of the arrangement of FIGURE 5.

In the embodiment of the invention illustrated in the drawings, a two part clip is shown which comprises an attaching portion in the form of a strap 1 and a base 2 which are formed in such a manner that they can be hooked together and clamped around a tube 3 as shown in FIGURES 5 and 6.

The strap 1, which may be made by stamping and bending a blank of material such as mild steel, is in the form of a U the rounded web of which is of substantially the same diameter as the tube 3. The ends of the limbs of the U are cut out to form lugs 4 the ends 5 of which are bent outwardly in such manner as to form abutments for engagement to the base. The abutments include an abutment edge 5a and a longitudinally extending camming edge 5b. Holes 5c are also formed in the lugs 4.

The base 2 is made from resilient material, for example by stamping and bending a spring steel blank and in the example illustrated is substantially lyre shaped, having a web 6 which is slightly saddle-shaped and pierced by a hole 7 adapted to receive a screw 8 for fixing the base to a support structure 9. The breadth of the web 6 is substantially equal to the diameter of the tube 3.

To the web 6 are connected, by curved portions 10, two arms 11 which are initially directed obliquely towards one another in such manner that their outline forms with the web 6 an isosceles triangle oab, which as shown in FIGURE 3 is preferably equilateral, and are then bent outwardly to form shoulders 12 and towards one another again at 13. At the base of the second bend 13 the arms 11 are pierced by slots 14 which are substantially rectangular and of a width somewhat greater than that of the ends of the limbs of the strap 1.

When the tube 3 is placed in the base 2, it is supported on the shoulders 12, between the free ends of the arms 11, as shown in full line in FIGURE 5. If downward pressure is applied to the tube the latter will tend to separate the arms 11 into the position shown in dot-dash lines in the same figure. If the tube is then released the arms of the base push it upwardly into its original position.

In order to attach the tube 3 to the fixed structure 9, the base is attached to the structure 9 and the tube is placed on the shoulders 12 of the base. Pressure is then applied on the tube in such manner as to separate the ends of the arms 11 slightly, and the strap 1 is then placed over the tube and the ends 4 of the limbs of the strap are passed between the ends of the arms 11 of the base in such manner that the said ends 4 pass into the slots 14. The abutments 5 initially separate the arms 11 further as the camming edges 5b force the arms progressively outwardly and then engage beneath the upper edge 15 of the slots 14 as shown in FIGURE 6.

When the strap is released the resilience of the base ensures the force necessary to hold the strap firmly to the base and eliminate all play between the two parts of the clip and the tube.

The relative dimensions of the base, the strap and the tube are of course such that the attaching operation can be quickly and easily carried out.

In order to disengage the tube 3 it is pressed downwardly towards the support. The tube then acts on the shoulders 12 to separate the arms 11 of the base, and if sufficient pressure is applied to the tube 3 this separation disengages the edges 15 of the arms 11 from the abutments 5. The strap and the tube can then be easily removed from the base.

This method of disengagement is extremely practical but if it is desired to eliminate the risk of accidental disengagement an abutment can be provided beneath the tube 3, which will prevent movement of the tube towards the support, thereby preventing the arms 11 from being separated sufficiently to free the abutments 5 of the strap.

For this purpose it is sufficient to use, instead of a screw 8 with a flat or countersunk head, a screw having a longer head, for example, a round head 8a, as shown in broken line in FIGURE 5, on which the tube abuts before the arms are sufficiently separated to release the strap.

In this case the tube may still be disengaged by separating the arms of the base with the aid of a tool such as a screwdriver or similar pointed tool by engaging the tool in the holes 5c in the strap and levering against the edge of the base.

If required the strap 1 may be provided with a coating of an insulating material such as a paint or a synthetic resin.

The above description represents only one example of the invention and it will be understood that the above described embodiment may be modified, particularly by the substitution of technical equivalents without departing from the spirit and scope of the invention which is best described in the following claims.

What I claim is:

1. A two part clip for a cylindrical member, said clip comprising a base portion for supporting the cylindrical member, and an attaching portion engageable on the base portion, said base portion comprising a web, and a pair of spaced upstanding resilient arms which are obliquely directed towards each other from the web, bowed outwardly intermediate their length to form a pair of spaced shoulders adapted to support the cylindrical member and which terminate in a pair of free ends projecting beyond said shoulder and inclined towards one another when unstressed; said attaching portion being substantially U shaped and having two substantially parallel limbs adapted to embrace the cylindrical member when the latter is supported on the said shoulders of the base portion, said limbs further adapted to be introduced between the free ends of the base portion and to releasably engage said free ends to resiliently clamp the cylindrical member between said shoulders and said attaching portion, said free ends extending approximately parallel in said clamping position; whereby pressure exerted on the cylindrical member supported on said shoulders towards said web will move said free ends apart to release said limbs from engagement therewith.

2. A two part clip for a cylindrical member, said clip comprising a base portion for supporting the cylindrical member, and an attaching portion engageable on the base portion, said base portion comprising a web, and a pair of spaced upstanding resilient arms which are obliquely directed towards each other from the web, bowed outwardly intermediate their length to form a pair of spaced shoulders adapted to support the cylindrical member, and which terminate in a pair of slotted free ends projecting beyond said shoulder; said attaching portion being substantially U shaped and having two substantially parallel limbs adapted to embrace the cylindrical member when the latter is supported on the said shoulders of the base portion, said limbs further adapted to be introduced between the free ends of the base portion and being formed with outwardly directed abutments adapted to extend through the slots in said free ends to releasably engage said free ends to resiliently clamp the cylindrical member between said shoulders and said attaching portion, said abutments being in the form of lugs extending outwardly at right angles to said limbs, each lug having a longitudinally extending camming edge adapted as it passes through a corresponding slot to move said arm progressively outwardly and then to snap engage through said slot; whereby pressure exerted on the cylindrical member supported on said shoulders towards said web will move said free ends apart to release said limbs from engagement therewith.

3. A two part clip for a cylindrical member, said clip comprising a base portion for supporting the cylindrical member, and an attaching portion engageable on the base portion, said base portion comprising a web, and a pair of spaced upstanding resilient arms which are obliquely directed towards each other from the web, bowed outwardly intermediate their length to form a pair of spaced shoulders adapted to support the cylindrical member, and which terminate in a pair of slotted free ends projecting beyond said shoulder; said attaching portion being substantially U shaped and having two substantially parallel limbs adapted to embrace the upper portion of the cylindrical member when the latter is supported on the said shoulders of the base portion, said limbs further adapted to be introduced between the free ends of the base portion and being formed with outwardly directed abutments adapted to extend through the slots in said free ends to releasably engage said free ends to resiliently clamp the cylindrical member between said shoulders and said attaching portion, said limbs remaining parallel during their engagement with said free ends; whereby pressure exerted on the cylindrical member supported on said shoulders towards said web will move said free ends apart to release said limbs from engagement therewith.

4. A two part clip as claimed in claim 3, further comprising means for attaching the web of the base portion to a fixed support, said means extending through said web portion with one end immediately adjacent said cylindrical member to prevent said cylindrical member from being depressed to open the arms of said base portion.

References Cited by the Examiner

UNITED STATES PATENTS

| 2,547,813 | 4/1951 | Coons et al. | 248—74 |
| 3,027,128 | 3/1962 | Liberty | 248—74 |

FOREIGN PATENTS

| 24,861 | 9/1951 | Finland. |
| 1,164,766 | 5/1958 | France. |
| 508,806 | 10/1930 | Germany. |

CLAUDE A. LE ROY, *Primary Examiner.*

R. P. SEITTER, *Assistant Examiner.*